(12) United States Patent
Inagawa et al.

(10) Patent No.: US 9,261,115 B2
(45) Date of Patent: Feb. 16, 2016

(54) HYDRAULIC CONTROL SYSTEM

(75) Inventors: Tomokazu Inagawa, Susono (JP);
Kenta Kimura, Susono (JP); Takafumi Inagaki, Susono (JP); Yuji Hattori, Gotenba (JP); Yu Nagasato, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 751 days.

(21) Appl. No.: 13/581,635

(22) PCT Filed: Dec. 9, 2011

(86) PCT No.: PCT/JP2011/078521
§ 371 (c)(1),
(2), (4) Date: Aug. 29, 2012

(87) PCT Pub. No.: WO2013/084346
PCT Pub. Date: Jun. 13, 2013

(65) Prior Publication Data
US 2013/0145757 A1 Jun. 13, 2013

(51) Int. Cl.
*F15B 1/033* (2006.01)
*F15B 11/042* (2006.01)
*F16H 61/00* (2006.01)
*F16H 61/662* (2006.01)

(52) U.S. Cl.
CPC .............. *F15B 11/0423* (2013.01); *F15B 1/033* (2013.01); *F16H 61/0021* (2013.01); *F16H 61/66272* (2013.01); *F15B 2211/212* (2013.01); *F15B 2211/50536* (2013.01); *F15B 2211/526* (2013.01); *F15B 2211/6306* (2013.01); *F15B 2211/6355* (2013.01); *F15B 2211/67* (2013.01); *F16H 2061/0034* (2013.01)

(58) Field of Classification Search
CPC ..... F15B 1/027; F15B 1/033; F16H 2061/0034
See application file for complete search history.

(56) References Cited

U.S. PATENT DOCUMENTS

2011/0088990 A1* 4/2011 Shimizu et al. ............ 192/85.01

FOREIGN PATENT DOCUMENTS

| JP | 03-229059 A | 10/1991 |
|----|-------------|---------|
| JP | 07-119821 A | 5/1995 |
| JP | 08-042677 A | 2/1996 |
| JP | 2010-151240 A | 7/2010 |
| JP | 2011-231818 A | 11/2011 |

* cited by examiner

*Primary Examiner* — F. Daniel Lopez
(74) *Attorney, Agent, or Firm* — Sughrue Mion, PLLC (57) ABSTRACT

A hydraulic control system comprises: a regulator valve, which regulates a fluid pressure established by an oil pump to an operating pressure required in a control circuit; a signal pressure establishing valve, which applies a signal pressure to the regulator valve to determine a level of the fluid pressure to be established by the regulator valve; and an accumulator, which accumulates the operating pressure to be applied to the control circuit. The hydraulic control system is characterized by: an accumulator control valve, which is arranged between the accumulator and the control circuit, and which is adapted to connect the accumulator with the control circuit when opened, and to disconnect the accumulator from the control circuit when closed; and a signal pressure feeding passage, which delivers the signal pressure established by the signal pressure establishing valve to a signal pressure port of the accumulator control valve thereby actuating the accumulator control valve in accordance with the signal pressure.

2 Claims, 7 Drawing Sheets

HYDRAULIC CONTROL SYSTEM

CROSS REFERENCE TO RELATED APPLICATIONS

This application is a National Stage of International Application No. PCT/JP2011/078521 filed Dec. 9, 2011, the contents of all of which are incorporated herein by reference in their entirety.

TECHNICAL FIELD

The present invention relates to a hydraulic control system for actuating a predetermined actuator. This invention pertains more particularly to a hydraulic control system having an accumulator adapted to accumulate fluid pressure therein and to deliver the accumulated pressure to the actuator thereby actuating the actuator.

BACKGROUND ART

A hydraulic control system is employed in industrial machineries and automobiles to control and actuate a device hydraulically actuated. For instance, in an automatic transmission of vehicles, a speed ratio thereof is changed hydraulically, and a transmission torque thereof is varied according to a pressure level. For this purpose, the fluid pressure is established by driving an oil pump by a prime mover of the vehicle, and the fluid pressure thus established is regulated to initial pressure called line pressure by a regulator valve. The line pressure thus established is further regulated according to need and delivered to a transmission, a clutch, a brake and etc. Japanese Patent Laid-Open No. 2010-151240 discloses an example of hydraulic control system applied to a belt-type continuously variable transmission. The hydraulic control system taught by Japanese Patent Laid-Open No. 2010-151240 comprises a high pressure hydraulic circuit for controlling the fluid pressure delivered to a pulley on which a belt is applied to change the speed ratio, and a low pressure hydraulic circuit for controlling the pressure of the oil delivered to a torque converter and the oil delivered to a portion to be lubricated. According to the teachings of Japanese Patent Laid-Open No. 2010-151240, the fluid pressure established by the hydraulic pump driven by the engine is regulated to a required pressure in the high pressure hydraulic circuit by a first regulator valve. The fluid pressure thus regulated by the first regulator valve is further lowered by a second regulator valve to be delivered to the torque convertor, and the fluid drained from the first regulator valve is delivered to the portion needs to be lubricated. In addition, an accumulator is arranged in the high pressure hydraulic circuit to accumulate the high fluid pressure applied to the high pressure hydraulic circuit. A solenoid switching valve is connected with an input side of the accumulator to connect the oil pump selectively with the accumulator and the high pressure hydraulic circuit. The electric oil pump for generating high pressure is connected with an input side of the changeover valve.

The above-explained first and the second regulator valves are adapted change the pressure regulating level in accordance with signal pressure from a predetermined solenoid valve. In addition, according to the teachings of Japanese Patent Laid-Open No. 2010-151240, the changeover valve is activated by an electromagnetic force of the solenoid, and the drive and the driven pulleys are individually provided with a feeding solenoid valve and a draining solenoid valve for controlling the fluid pressure delivered thereto. Meanwhile, a hydraulic control system or a hydraulic control circuit for a geared transmission is disclosed in Japanese Patent Laid-Opens Nos. 7-119821 and 8-42677. According to the teachings of Japanese Patent Laid-Opens Nos. 7-119821 and 8-42677, signal pressure of a linear solenoid valve for maintaining a slipping state of a lockup clutch is also used to control an engagement pressure of a brake and back pressure of the accumulator.

In order to deliver large amount of high pressured fluid promptly to the pulleys thereby changing the speed ratio quickly, according to the teachings of Japanese Patent Laid-Opens No. 2010-151240, an electrically controllable solenoid valve is used as the accumulator control valve. Therefore, control response of the fluid pressure delivered to the pulley is improved. However, in the control system taught by Japanese Patent Laid-Open No. 2010-151240, the solenoid valves are used to regulate the fluid pressure, to deliver and discharge the fluid to/from the pulleys, and to connect the accumulator and the oil pump selectively. Thus, a large number of the electrically controlled solenoid valves are used in the control system taught by Japanese Patent Laid-Opens No. 2010-151240, and this will increase a cost of the control system. In addition, a size of the control system has to be enlarged.

Thus, according to the teachings of Japanese Patent Laid-Opens Nos. 7-119821 and 8-42677, the signal pressure used to control the slipping state of the lockup clutch is also used for other kind of controls. Therefore, number of parts such as solenoid valves for establishing the signal pressure to be used for other kind of controls can be reduced. However, according to the teachings of Japanese Patent Laid-Open No. 8-42677, the back pressure of the accumulator is controlled under the situation in which the slipping control of the lockup clutch is not carried out. Likewise, according to the teachings of Japanese Patent Laid-Open No. 7-119821, the engagement pressure of the brake is also controlled under the situation in which the slipping control of the lockup clutch is not carried out. That is, both Japanese Patent Laid-Opens Nos. 7-119821 and 8-42677 disclose techniques to utilize unused solenoid valve for other kind of controls, and teachings of those prior art documents do not relate to a technique to use predetermined devices or parts for multiple applications simultaneously. Therefore, the hydraulic control systems taught by Japanese Patent Laid-Opens Nos. 7-119821 and 8-42677 are required to be further downsized, and manufacturing cost thereof can be further reduced.

DISCLOSURE OF THE INVENTION

The present invention has been conceived noting the technical problems thus far described, and its object is to downsize a hydraulic control system and to reduce a manufacturing cost thereof.

The hydraulic control system according to the present invention comprises: a regulator valve, which regulates a fluid pressure established by an oil pump to an operating pressure required in a control circuit; a signal pressure establishing valve, which applies a signal pressure to the regulator valve to determine a level of the fluid pressure to be established by the regulator valve; and an accumulator, which accumulates the operating pressure to be applied to the control circuit. In order to achieve the above-mentioned object, according to the present invention, the hydraulic control system is characterized by: an accumulator control valve, which is arranged between the accumulator and the control circuit, and which is adapted to connect the accumulator with the control circuit when opened, and to disconnect the accumulator from the control circuit when closed; and a signal pressure feeding passage, which delivers the signal pressure established by the signal pressure establishing valve to a signal pressure port of the accumulator control valve thereby actuating the accumulator control valve in accordance with the signal pressure.

The accumulator control valve is closed to disconnect the accumulator from the control circuit by a signal pressure established by the signal pressure establishing valve, in case the signal pressure establishing valve outputs the signal pressure at a level possible to raise the operating pressure in the control circuit. To the contrary, the accumulator control valve is opened to connect the accumulator with the control circuit by a signal pressure established by the signal pressure establishing valve, in case the signal pressure establishing valve outputs the signal pressure at a level possible to lower the operating pressure in the control circuit.

Specifically, the signal pressure establishing valve outputs a first signal pressure, which allows the regulator valve to establish an operating pressure required in the control circuit while closing the accumulator control valve to disconnect the accumulator from the control circuit, in case the operating pressure required in the control circuit is higher than the pressure in the accumulator.

Instead, the signal pressure establishing valve can also output a signal pressure, which allows the regulator valve to establish an operating pressure in the control circuit lower than the pressure in the accumulator while opening the accumulator control valve to connect the accumulator with the control circuit, in case the operating pressure required in the control circuit is lower than the pressure in the accumulator.

In this case, that is, in case the required pressure is lower than the pressure in the accumulator, and the pressure in the accumulator is lowered to a predetermined level at which a pressure accumulation is carried out, the signal pressure establishing valve outputs a second signal pressure, which allows the regulator valve to establish the fluid pressure higher than the pressure in the accumulator while opening the accumulator control valve.

Meanwhile, in case the required pressure is lower than the pressure in the accumulator, and the pressure in the accumulator is higher than the pressure within a predetermined range to accumulate the pressure in the accumulator, the signal pressure establishing valve outputs a third signal pressure, which allows the regulator valve to establish the fluid pressure lower than the pressure in the accumulator while opening the accumulator control valve.

The hydraulic control system further comprises a low pressure circuit activated by the pressure lower than that in the control circuit. Therefore, the regulator valve is adapted to establish a low operating pressure which is lower than the operating pressure delivered to the control circuit in accordance with the signal pressure. For this purpose, the signal pressure establishing valve outputs the third signal pressure which is sufficient to allow the regulator valve to establish the low operating pressure.

According to the hydraulic control system of the present invention, therefore, the operating pressure in the control circuit is controlled based on the signal pressure outputted from the signal pressure establishing valve. At the same time, the signal pressure is also delivered to the signal pressure port of the accumulator control valve through the signal pressure feeding passage to open or close the accumulator control valve. Thus, according to the present invention, the signal pressure outputted from the signal pressure establishing valve can be used commonly and simultaneously to regulate the operating pressure and to open or close the accumulator control valve. That is, the signal pressure establishing valve can be used commonly to regulate the operating pressure and to actuate the accumulator control valve. Therefore, number of valves can be reduced so that a manufacturing cost of the hydraulic control system is reduced. In addition the hydraulic control system itself can be downsized.

The accumulator control valve is closed in case the regulating level is high, that is, in case of raising the operating pressure. To the contrary, accumulator control valve is opened in case the regulating level is low, that is, in case of lowering the operating pressure. According to the hydraulic control system thus structured, in case of raising the operating pressure, the fluid can be partially delivered to the accumulator without causing delay in raising the operating pressure of the control circuit. In other words, a control response to raise the operating pressure can be improved.

Specifically, in case the operating pressure required by the control circuit is higher than the current pressure in the accumulator, the required pressure cannot be established only by the pressure accumulated in the accumulator. In this case, therefore, the fluid pressure established by the oil pump is regulated to a high pressure to achieve the required pressure. However, according to the present invention, the fluid in the control circuit can be prevented from leaking toward the accumulator. Therefore, the operating pressure in the control circuit as well as the operating pressure of the actuator connected with the control circuit can be raised promptly. Thus, a response to raise the operating pressure to the required level can be improved.

To the contrary, in case the operating pressure required by the control circuit is lower than the pressure accumulated in the accumulator, the accumulator control valve is opened to connect the accumulator with the control circuit, by the signal pressure outputted from the signal pressure establishing valve to achieve the required operating pressure. By thus setting the signal pressure to raise the operating pressure higher than the pressure in the accumulator, the operating pressure can be regulated to the required level, and at the same time, the pressure can be accumulated into the accumulator. In addition, in case the operating pressure required by the control circuit is thus lower than the pressure accumulated in the accumulator, a discharging amount of the oil pump can be reduced by delivering the pressure accumulated in to accumulator to the control circuit. Consequently, energy consumption can be saved. This advantage can be achieved by carrying out a pressure regulation by the regulator valve in a manner to deliver the low operating pressure to the low pressure circuit.

BEST MODE FOR CARRYING OUT THE INVENTION

Figure 1:
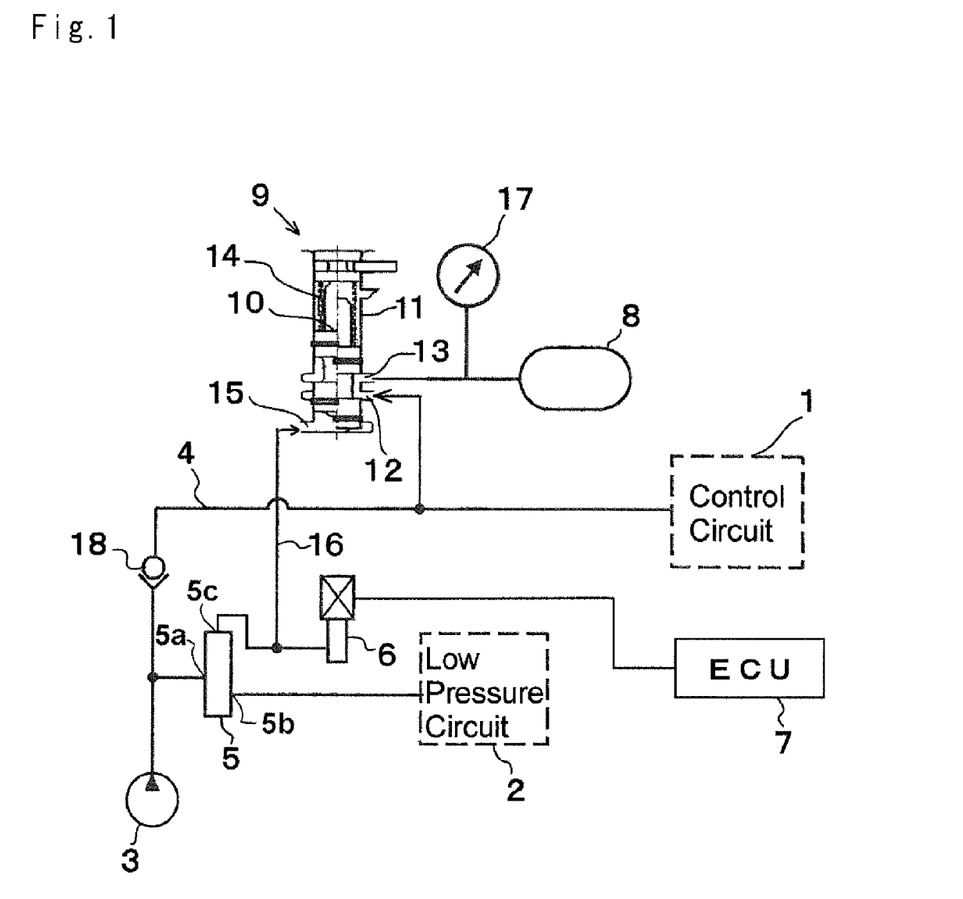
FIG. 1 is a hydraulic circuit diagram schematically showing one example of the hydraulic control system of the present invention.

The present invention will be explained in more detail with reference to the accompanying drawings. FIG. 1 schematically illustrates an example of applying the present invention to a hydraulic control system comprising a control circuit 1 in which the operating pressure is relatively high, and a low pressure circuit 2 in which the operating pressure is relatively low. The hydraulic control system is provided with an oil pump 3 driven by an engine or an electric motor (both not shown) to establish fluid pressure, and the oil pump 3 is connected with the control circuit 1 through an oil passage 4. In order to regulate the fluid pressure established by the oil pump 3 or the fluid pressure in the oil passage 4 to a predetermined operating pressure, a regulator valve 5 is arranged on the oil passage 4. Specifically, the operating pressure is a line pressure as an initial pressure of the hydraulic control system. The regulator valve 5 is used to regulate the fluid pressure (i.e., the operating pressure) in the oil passage 4 in accordance with the signal pressure. For example, a conventional primary regulator valve adapted to establish the line pressure of an automatic transmission of automobiles, and the regulator valve disclosed in Japanese Patent Laid-Open No. 2010-151240 can be used to serve as the regulator valve 5.

The regulator valve 5 comprises a spool having lands for connecting and disconnecting an input port 5a and a drain port 5b. An elastic member is arranged on one of the end portions of the spool to push the spool in its axial direction, and a signal pressure port 5c is also arranged on said one end portions. Meanwhile, a feedback port is arranged on the other end portion of the spool so that the fluid pressure in the oil passage 4 is applied to the spool. That is, a total load of an elastic force of the elastic member and the signal pressure inputted to the signal pressure port 5c is applied to said one of the end portions of the spool, and a load of the operating pressure acting on the feedback port is applied to the other end portion of the spool. Therefore, the spool is moved according to a change in a balance of those loads. Specifically, in case the spool is moved in the direction to open the drain port 5b, the fluid in the oil passage 4 is drained therefrom so that the pressure therein is lowered. To the contrary, in case the spool is returned to close the drain port 5b, the operating pressure in the oil passage 4 is raised. Thus, in the regulator valve 5, the loads are applied to the spool from both sides in a manner to be balanced to each other, and the operating pressure in the oil passage 4 is changed in accordance with the signal pressure. For example, the operating pressure in the oil passage 4 is raised by increasing the signal pressure, and to the contrary, the operating pressure in the oil passage 4 is lowered by reducing the signal pressure.

The operating pressure required in the control circuit 1 has to be varied depending on the operating condition of the hydraulic control system, an external requirement and so on. Therefore, the signal pressure delivered to the regulator valve 5 is varied arbitrarily. For this purpose, a signal pressure establishing valve 6 is arranged in the hydraulic control system. Specifically, a linear solenoid valve is used to serve as the signal pressure establishing valve 6, and the signal pressure establishing valve 6 is adapted to output the signal pressure in accordance with an electric signal such as a current applied to a solenoid. The signal pressure outputted from the signal pressure establishing valve 6 is delivered to the regulator valve 5 so that the pressure regulating level of the regulator valve 5 is changed depending on the signal pressure applied thereto.

In order to control the signal pressure establishing valve 6, the hydraulic control system is provided with an electronic control unit (abbreviated as ECU) 7. The ECU 7 is composed mainly of microcomputer, which is configured to carry out a calculation on the basis of data inputted thereto and data stored in advance, and to output a control signal to the signal pressure establishing valve 6. Provided that the hydraulic control system shown in FIG. 1 is applied to an automobile, data about an opening degree of an accelerator, a vehicle speed, an oil temperature etc. are inputted to the ECU 7.

As described, the regulator valve 5 is adapted to regulate the pressure of the fluid discharged from the oil pump 3 while draining the fluid partially from the drain port 5b. Consequently, drain pressure at a predetermined pressure level is outputted from the regulator valve 5, and the drain pressure thus outputted from the regulator valve 5 is delivered to a low pressure circuit 2 to serve as initial pressure or low operating pressure.

The control circuit 1 is connected with an accumulator 8 for accumulating fluid pressure through the oil passage 4. In addition, an accumulator control valve 9 is arranged on the oil passage 4 between the control circuit 1 and the accumulator 8. The accumulator 8 is a conventional accumulator, in which a piston sustained by an elastic member such as a spring, or a member elastically expanded by a gas encapsulated therein is arranged in a container. Therefore, a capacity of the accumulator 8 is varied elastically so that the fluid pushed therein can be accumulated at a predetermined pressure.

Specifically, the accumulator control valve 9 is an on-off valve adapted to connect and disconnect the accumulator 8 to/from the control circuit 8 selectively. For this purpose, the accumulator control valve 9 is opened and closed in accordance with the fluid pressure applied thereto as the signal pressure. For example, a poppet valve, a needle valve, a butterfly valve and so on can be used as the accumulator control valve 9, and in the example shown in FIG. 1, a spool valve is used as the accumulator control valve 9. Specifically, the accumulator control valve 9 comprises a spool 10 on which land portions and valley portions are formed integrally, and a cylinder 11 having an input port 12 and an output port 13. The spool 10 thus structured is inserted into a cylinder 10 in a manner to reciprocate in an axial direction. Therefore, the input port 12 is closed by one of the land portions in case the spool 10 is situated at a predetermined axial position, and the input port 12 is connected and disconnected selectively to/from the output port 13 depending on the axial position of the spool 10.

In order to push the spool 10 in its axial direction (i.e., downwardly in FIG. 1), a spring 14 is arranged on one of the end sides of the spool 10. Meanwhile, a signal pressure port 15 is formed on the other end side of the spool 10 to apply fluid pressure to the spool 10 in a direction to compress the spring 14. The aforementioned control circuit 1 is connected with the input port 12 through the oil passage 4, and the accumulator 8 is connected with the output port 13. The signal pressure port 15 is connected with the signal pressure establishing valve 6 through a signal pressure feeding passage 16 so that the signal pressure from the signal pressure establishing valve 6 can be delivered to the signal pressure port 15. An area of a face receiving the elastic force of the spring 14 and the signal pressure is set to an area possible to actuate the spool 10 according to a level of the signal pressure thereby opening and closing the accumulator control valve 9. In order to detect a value of the fluid pressure accumulated in the accumulator 8, a hydraulic sensor 17 adapted to output a detection signal is arranged between the accumulator 8 and the accumulator control valve 9. In addition, in order to prevent backflow of the fluid in the accumulator 8 toward the oil pump 3, a check valve 18 is arranged on the oil passage 4 between the accumulator 8 and the oil pump 3.

Figure 2:
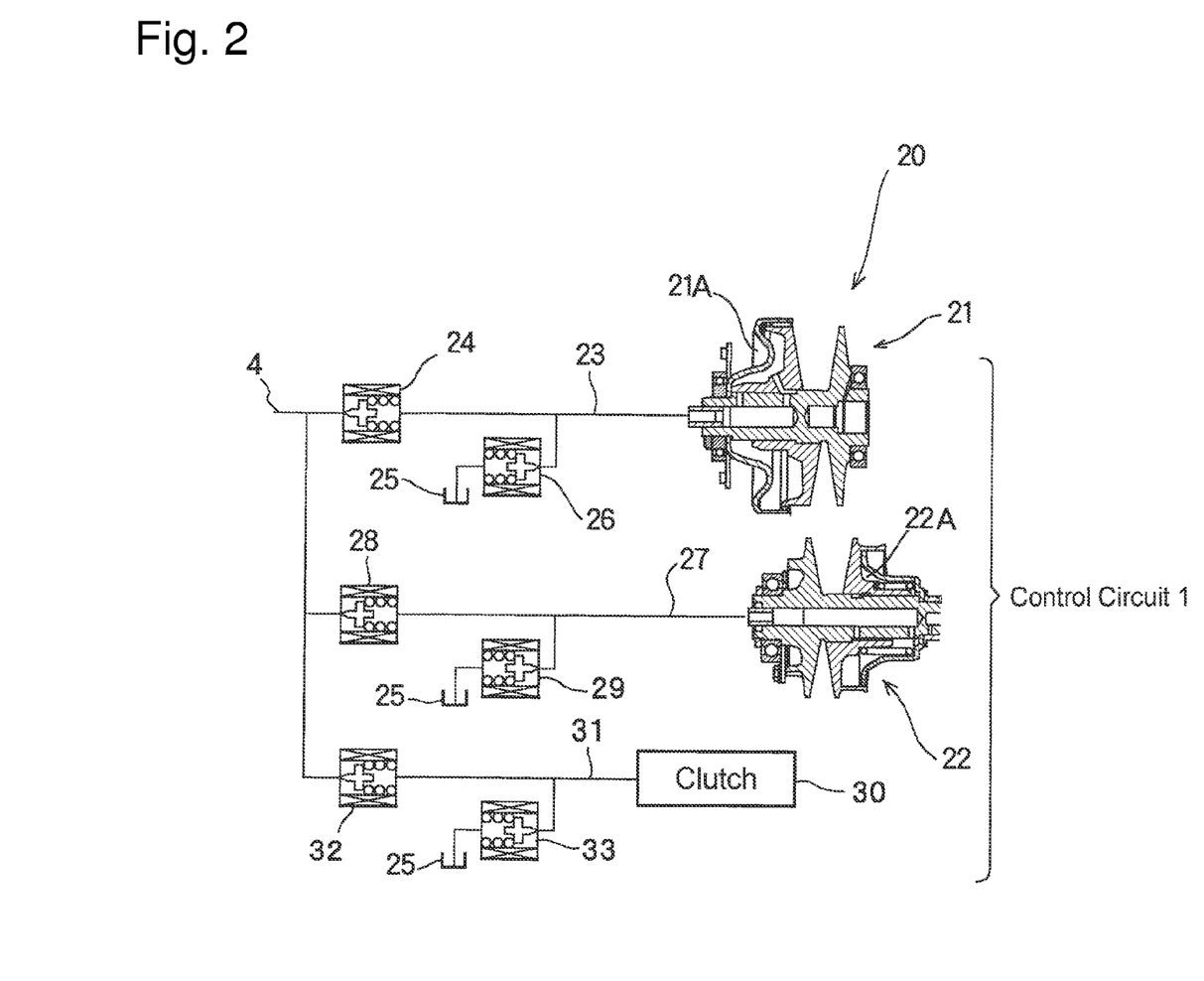
FIG. 2 is a hydraulic circuit diagram showing a control circuit in detail.

As described, the hydraulic control system according to the present invention can be applied to a control circuit of a transmission for automobiles. In this case, the control circuit is structured as illustrated in FIG. 2. FIG. 2 is a schematic view showing an example of the control circuit 1 arranged in a belt-type continuously variable transmission. The continuously variable transmission 20 shown therein comprises a drive pulley (i.e., a primary pulley) 21, a driven pulley (i.e., a secondary pulley) 22, and a belt applied to those pulleys 21 and 22. Therefore, a speed ratio of the continuously variable transmission 20 is varied by changing groove widths of those pulleys 21 and 22 to change running radii of the belt applied thereon. For this purpose, each pulley 21 and 22 comprises a fixed sheave integrated with a rotary shaft, and a movable sheave allowed to reciprocate along a rotational axis of the rotary shaft toward the fixed sheave and away from the fixed sheave. In order to apply fluid pressure to movable sheaves to move toward the fixed sheave, the pulley 21 is provided with a hydraulic chamber (or a hydraulic actuator) 21A, and the pulley 22 is provided with a hydraulic chamber (or a hydraulic actuator) 22A. Specifically, the groove width of one of the pulleys 21 and 22 is varied according to the fluid pressure (or an amount of the fluid) applied thereto, and a pressure of the other pulley 21 or 22 for clamping the belt which determines a transmission torque capacity is governed by the fluid pressure applied thereto. In this example, torque is transmitted to not shown drive wheels from the driven pulley 22.

An oil passage 23 is branched form the oil passage 4 to be connected with the hydraulic chamber 21A of the drive pulley 21, and a feeding solenoid valve 24 is arranged on the oil passage 23. Therefore, the fluid is delivered selectively to the hydraulic chamber 21A of the drive pulley 21 by opening or closing the oil passage 23 selectively by the feeding solenoid valve 23. In addition, a draining solenoid valve 26 is connected with the hydraulic chamber 21A of the drive pulley 21 so that the fluid in the hydraulic chamber 21A can be drained to an oil pan 25. In the example shown in FIG. 2, specifically, the draining solenoid valve 26 is arranged on the oil passage 23 connecting the feeding solenoid valve 24 and the hydraulic chamber 21A. Those feeding solenoid valve 24 and draining solenoid valve 26 are electrically controlled to actuate a port thereof, and when those valves 24 and 26 are not energized (i.e., under OFF state), the ports thereof are closed not to leak the fluid therefrom. For this reason, current speed ratio and transmission torque can be maintained by confining the fluid in the hydraulic chamber 21A even in case power distribution to the valves 24 and 26 is interrupted.

A structure of a hydraulic feeding mechanism of the hydraulic chamber 22A of the driven pulley 22 is similar to that of the hydraulic chamber 21A of the drive pulley 21. Specifically, an oil passage 27 is branched form the oil passage 4 to be connected with the hydraulic chamber 22A of the driven pulley 21, and a feeding solenoid valve 28 is arranged on the oil passage 27. Therefore, the fluid is delivered selectively to the hydraulic chamber 22A of the driven pulley 22 by opening or closing the oil passage 27 selectively by the feeding solenoid valve 28. In addition, a draining solenoid valve 29 is connected with the hydraulic chamber 22A of the drive pulley 22 so that the fluid in the hydraulic chamber 22A can be drained to an oil pan 25. In the example shown in FIG. 2, specifically, the draining solenoid valve 29 is arranged on the oil passage 27 connecting the feeding solenoid valve 28 and the hydraulic chamber 22A.

Those feeding solenoid valve 28 and draining solenoid valve 29 are electrically controlled to actuate a port thereof, and when those valves 28 and 29 are not energized (i.e., under OFF state), the ports thereof are closed in a manner not to leak the fluid therefrom. For this reason, the current speed ratio and transmission torque can be maintained by confining the fluid in the hydraulic chamber 22A even in case power distribution to the valves 28 and 29 is interrupted.

In addition, the example shown in FIG. 2 is further provided with a clutch 30. The clutch 30 is arranged on a powertrain for transmitting the torque from the engine to the drive wheels to be used to transmit the torque when engaged, and to interrupt a torque transmission when disengaged. Therefore, drive torque of the vehicle is applied to the clutch 30 when transmitting the torque. For this purpose, the clutch 30 is adapted to be engaged by a comparatively high pressure. Specifically, an oil passage 31 is further branched form the oil passage 4 to be connected with the clutch 30, and a feeding solenoid valve 32 is arranged on the oil passage 31. Therefore, the fluid is delivered selectively to a hydraulic chamber of the clutch 30 by opening or closing the oil passage 31 selectively by the feeding solenoid valve 32. In addition, a draining solenoid valve 33 controlled electrically is connected with the hydraulic chamber of the clutch 30 so that the fluid in the clutch 30 can be drained to the oil pan 25. Those feeding solenoid valve 32 and draining solenoid valve 33 are adapted to close the ports thereof in a manner not to leak the fluid therefrom when those valves 32 and 33 are not energized (i.e., under OFF state). For this reason, the current transmission torque can be maintained by engaging the clutch 30 even in case power distribution to the valves 32 and 33 is interrupted.

Meanwhile, the low pressure circuit 2 is activated by the fluid pressure lower than the fluid pressure required to activate the control circuit 1. For example, the low pressure circuit 2 includes: a valve and a torque converter for regulating the fluid pressure drained form the regulator valve 5; slipping portions necessary to be lubricated; a valve for opening and closing oil passages connected with the torque converter and the portion to be lubricated, or switching those oil passages. As the conventional automatic transmission for automobiles, the torque converter is arranged between the engine and the transmission. The solenoid valves 24, 26, 28, 29, 32 and 33 shown in FIG. 2, and the valves in the low pressure circuit 2 are controlled by the aforementioned electronic control unit 7, and the aforementioned hydraulic sensor 17 transmits the detection signal to the electronic control unit 7.

According to the present invention, the hydraulic control system regulates the operating pressure in accordance with drive a demand and a vehicle speed represented by an opening degree of an accelerator, and at the same time, the hydraulic control system carries out an opening and closing control of the accumulator control valve 9. The operating pressure is regulated by setting a regulating level of the regulator valve 5 in accordance with a signal pressure outputted from the signal pressure establishing valve 6. Specifically, when the signal pressure is raised, the regulating level is thereby increased. Consequently, the operating pressure in the oil passage 4 is raised. For example, when the opening degree of the accelerator is increased, the signal pressure establishing valve 6 is activated by the command signal from the ECU 7 to outputs the signal pressure in accordance with the opening degree of the accelerator thus increased. As a result, the operating pressure in the oil passage 4, that is, the control pressure in the control circuit 1 is regulated in accordance with the opening degree of the accelerator (in other words, an engine load or an engine torque). In this situation, the signal pressure is delivered not only to the regulator valve 5 but also to the signal pressure port 15 of the accumulator control valve 9 via the signal pressure feeding passage 16. As a result, the accumulator control valve 9 is opened or closed by the signal pressure delivered thereto. Thus, the signal pressure outputted from the signal pressure establishing valve 6 is used to regulate the operating pressure and to actuate the accumulator control valve 9. For this purpose, the signal pressure is controlled by the electronic control unit 7 as explained hereinafter.

Figure 3:
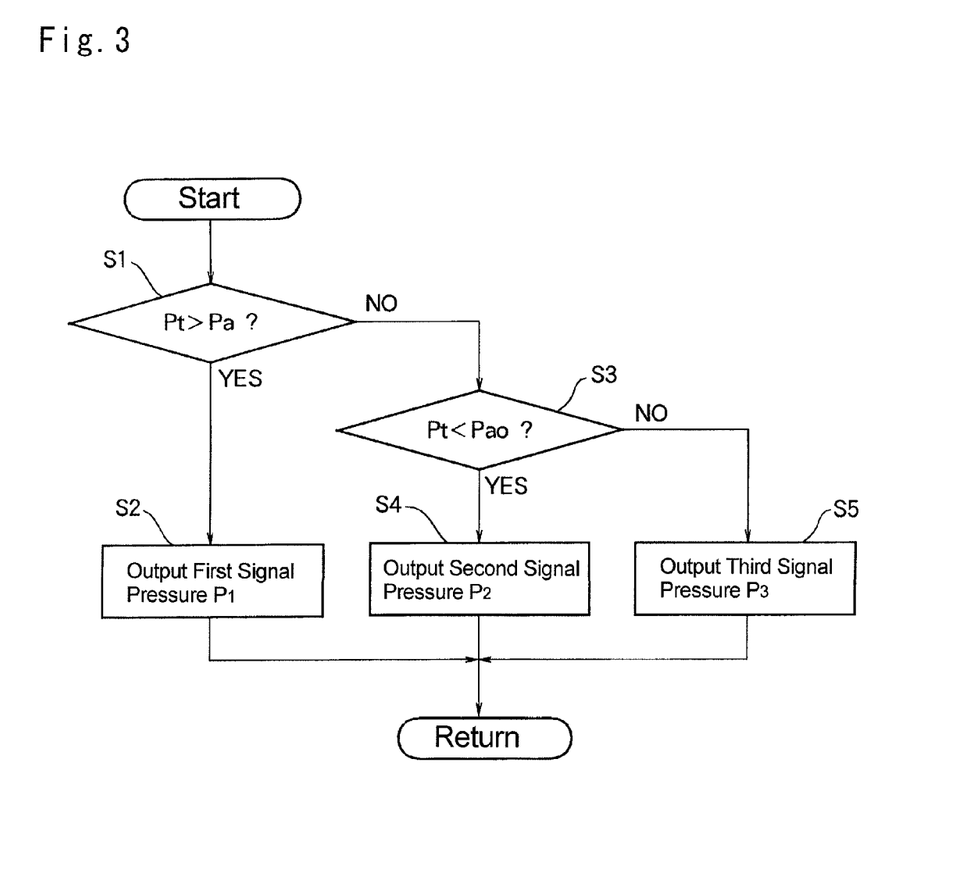
FIG. 3 is a flowchart explaining a control example carried out by the hydraulic control system according to the present invention.

FIG. 3 is a flowchart explaining a control example, and the routine shown therein is repeated in the electronic control unit 7 at predetermined short cycle. According to the control example shown in FIG. 3, first of all, it is judged whether or not a pressure Pt required in the control circuit 1 (i.e., required hydraulic pressure or a demanded pressure) is higher than an accumulator pressure Pa (at step S1). If the control circuit 1 includes the pulleys 21 and 22 shown in FIG. 2, the torque transmitted by the continuously variable transmission 20 is increased in accordance with an increase in the opening degree of the accelerator. Therefore, a required value of the operating pressure (i.e., a control pressure) determining a transmission torque capacity of the continuously variable transmission 20 is increased in accordance with an increase in the opening degree of the accelerator. Accordingly, the pressure Pt required in the control circuit 1 can be obtained based on data about a running condition of the vehicle such as an opening degree of the accelerator or a vehicle speed. For this purpose, a map determining a relation between the required fluid pressure and those data is prepared in advance, and the required pressure Pt is obtained according to those data with reference to the map. Meanwhile, the accumulator pressure Pa is a pressure accumulated in the accumulator 8, and the accumulator pressure Pa can be detected by the hydraulic sensor 17.

In case the required pressure Pt of the control circuit 1 is higher than the accumulator pressure Pa so that the answer of step S1 is YES, the signal pressure established by the signal pressure establishing valve 6 is set to a first signal pressure P1 (at step S2). Then the routine shown in FIG. 3 is returned. Specifically, the first signal pressure P1 is higher than the minimum pressure $P_{close}$ to close the accumulator control valve 9 (in other words, the maximum pressure to open the accumulator control valve 9). The first signal pressure P1 is applied to the regulator valve 5 thereby setting the regulating level of the regulator valve 5 to the level possible to achieve the required pressure Pt, and the fluid pressure thus regulated to the required pressure Pt is delivered to the control circuit 1 as the operating pressure.

Accordingly, in case the required fluid pressure Pt is high, the operating pressure (or the line pressure) is raised and the accumulator control valve 9 is closed to disconnect the accumulator 8 from the oil passage 4 or from the control circuit 1. In this situation, the fluid in the oil passage 4 will not flow into the accumulator 8 so that the operating pressure is raised promptly in accordance with the increase in the regulating level of the regulator valve 5. Therefore, control response of the fluid pressure in the control circuit 1 can be improved. In addition, according to the control shown in FIG. 3, if the required fluid pressure Pt is higher than the accumulator pressure Pa, the accumulator 8 is disconnected from the oil passage 4 or from the control circuit 1 in accordance with the increase in the regulating level of the regulator valve 5 irrespective of the level of the accumulator pressure Pa. Therefore, the control response to raise the operating pressure in the control circuit 1 can be improved irrespective of the level of the accumulator pressure Pa.

To the contrary, in case the answer of step S1 is NO, that is, in case the required pressure Pt in the control circuit 1 is lower than the accumulator pressure Pa, it is judged whether or not the fluid pressure has to be accumulated in the accumulator 8 (at step S3). That is, it is judged whether or not the pressure Pa in the accumulator 8 is lowered to a predetermined pressure to start accumulating the pressure therein. Specifically, it is judged whether or not the accumulator pressure Pa detected by the hydraulic sensor 17 is lower than an upper limit pressure Pa0 of a predetermined range. Such pressure accumulation of the accumulator 8 is carried out to ensure the fluid pressure which can maintain a current speed ratio or which can carry out a speed change operation, in preparation for a situation in which the engine is stopped and the oil pump 3 is thereby stopped to generate fluid pressure. For this purpose, the upper limit pressure Pa0 to carry out the pressure accumulation is set in advance to a level which can maintain the current speed ratio or which can carry out the speed change operation, based on an experimental result.

In case the accumulator pressure Pa is lower than the upper limit pressure Pa0 to carry out the pressure accumulation so that the answer of step S3 is YES, the signal pressure established by the signal pressure establishing valve 6 is set to a second signal pressure P2 (<P1) (at step S4), and then the routine shown in FIG. 3 is returned. Specifically, the second signal pressure P2 is lower than the minimum pressure $P_{close}$ to close the accumulator control valve 9. The second signal pressure P2 is applied to the regulator valve 5 thereby setting the regulating level of the regulator valve 5 to the level possible to establish the fluid pressure higher than the accumulator pressure Pa, and the fluid pressure thus regulated to be higher than the accumulator pressure Pa is delivered to the control circuit 1 as the operating pressure. In this situation, accordingly, the second signal pressure P2 lower than the minimum pressure $P_{close}$ is applied to the signal pressure port 15 so that the accumulator control valve 9 is opened, and the operating pressure in the oil passage 4 is raised to be higher than the accumulator pressure Pa. Therefore, the fluid pressure established by the oil pump 3 is regulated by the regulator valve 5, and the fluid pressure regulated by the regulator valve 5 is delivered to the control circuit 1 while being delivered to the accumulator 8 to be accumulated therein. Thus, the operating pressure is regulated by the signal pressure of the signal pressure establishing valve 6, and at the same time, the pressure accumulation is carried out.

In case the answer of step S3 is NO, that is, in case the pressure Pa in the accumulator 8 detected by the hydraulic sensor 17 is higher than the predetermined pressure level to start accumulating the pressure in the accumulator 8, this means that the accumulator pressure Pa is higher than the required pressure Pt of the control circuit 1 and it is unnecessary to accumulate the pressure into the accumulator 8. In this case, the fluid pressure accumulated in the accumulator 8 is delivered to the control circuit 1, and the signal pressure established by the signal pressure establishing valve 6 is set to a third signal pressure P3 (<P2) (at step S5). Then, the routine shown in FIG. 3 is returned. As indicated above, the third signal pressure P3 is lower than the second signal pressure P2. Specifically, the third signal pressure P3 is sufficiently lower than the minimum pressure $P_{close}$ to close the accumulator control valve 9, that is, the third signal pressure P3 is a pressure which can open the accumulator control valve 9. In this case, the pressure required by the control circuit 1 is lower than the accumulator pressure Pa so that the accumulator 8 can be used as a hydraulic source of the control circuit 1. Therefore, the third signal pressure P3 is determined based on the pressure required in the low pressure circuit 2, irrespective of the pressure required in the control circuit 1. Specifically, the third signal pressure P3 is set to a level which can set the regulating level of the regulator valve 5 to the level possible to drain the pressure therefrom at the level required by the low pressure circuit 2.

Thus, in this case, the third signal pressure P3 sufficiently lower than the minimum pressure $P_{close}$ is applied to the signal pressure port 15 so that the accumulator control valve 9 is opened, and the operating pressure in the oil passage 4 is reduced to be lower than the accumulator pressure Pa. Consequently, the pressure accumulated in the accumulator 8 is delivered to the control circuit 1. In this situation, the operating pressure is regulated by the regulator valve 5 to a significantly low pressure. However, the regulating level of the regulator valve 5 is set by the third signal pressure P3 to the level at which the drain pressure from the regulator valve 5 drained as a result of regulating the pressure is higher than the pressure required in the low pressure circuit 2. Meanwhile, the operating pressure is set in accordance with the regulating level of the regulator valve 5. That is, the operating pressure is regulated by the signal pressure of the signal pressure establishing valve 6, and at the same time, the pressure accumulated in the accumulator 8 is delivered to the control circuit 1 also in this case.

Figure 4:
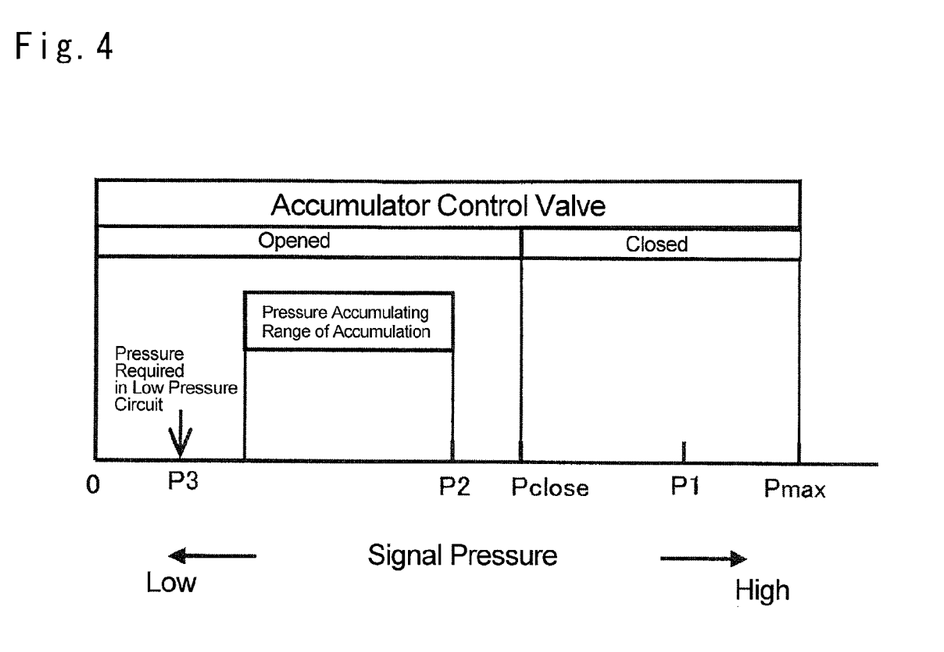
FIG. 4 is a graph showing relations between the first to the third signal pressures, and an opening condition of the accumulator control valve.

FIG. 4 is a graph showing relations among the first to the third signal pressures P1, P2 and P3, and a relation between the opening condition of the accumulator control valve 9 and the pressure accumulation. As shown in FIG. 4, the accumulator control valve 9 is closed under the condition in which the signal pressure applied to the signal pressure port 15 thereof is higher than the minimum pressure $P_{close}$. In this situation, specifically, the first signal pressure P1 is outputted from the signal pressure establishing valve 6 to close the accumulator control valve 9, and the accumulator 8 is thereby disconnected from the oil passage 4 or from the control circuit 1. As a result, a relatively high fluid pressure regulated based on the third signal pressure P1 is established promptly, and delivered to the control circuit 1. Therefore, control response to raise the operating pressure in the oil passage 4 or in the control circuit 1 can be improved.

To the contrary, in case the signal pressure is lower than the minimum pressure $P_{close}$, the spool 10 in the accumulator control valve 9 is pushed by the spring 14 toward the signal pressure port 15 side. As a result, the input port 12 and the output port 13 are connected to each other, that is, the accumulator control valve 9 is opened so that the accumulator 8 is connected with the oil passage 4 or with the control circuit 1. In this situation, therefore, the fluid pressure can be accumulated into the accumulator 8 in accordance with the accumulator pressure Pa, or in accordance with the pressure level in the oil passage 4 or in the control circuit 1. In this situation, alternatively, the fluid pressure can also be outputted from the accumulator 8. Specifically, when the signal pressure is set to the second signal pressure P2, the operating pressure in the oil passage 4 or in the control circuit 1 is raised to be higher than the accumulator pressure Pa so that the pressure is accumulated in the accumulator 8. To the contrary, when the signal pressure is set to the third signal pressure P3, the operating pressure in the oil passage 4 or in the control circuit 1 is lowered to be lower than the accumulator pressure Pa so that the pressure is delivered to the oil passage 4 or to the control circuit 1 from the accumulator 8. In other words, the accumulator 8 serves as a hydraulic source of the control circuit 1. At the same time, the fluid pressure required in the low pressure circuit 2 is delivered thereto from the regulator valve 5.

As described, according to the hydraulic control system of the present invention, the operating pressure in the oil passage 4 or in the control circuit 1 is established based on the signal pressure from the signal pressure establishing valve 6, and at the same time, the accumulator 8 is connected to the control circuit 1 or disconnected from the control circuit 1. That is, the signal pressure establishing valve 6 not only serves as a control means for regulating the operating pressure but also serves as a control means for connecting and disconnecting the accumulator 8 to/from the control circuit 1. Thus, the signal pressure establishing valve 6 is used commonly in the controls carried out simultaneously. According to the hydraulic control system of the present invention, therefore, constructional elements used in the controls carried out simultaneously can be commoditized. For this reason, number of required parts can be reduced to reduce a manufacturing cost, and in addition, the hydraulic control system can be downsized.

Figure 5:
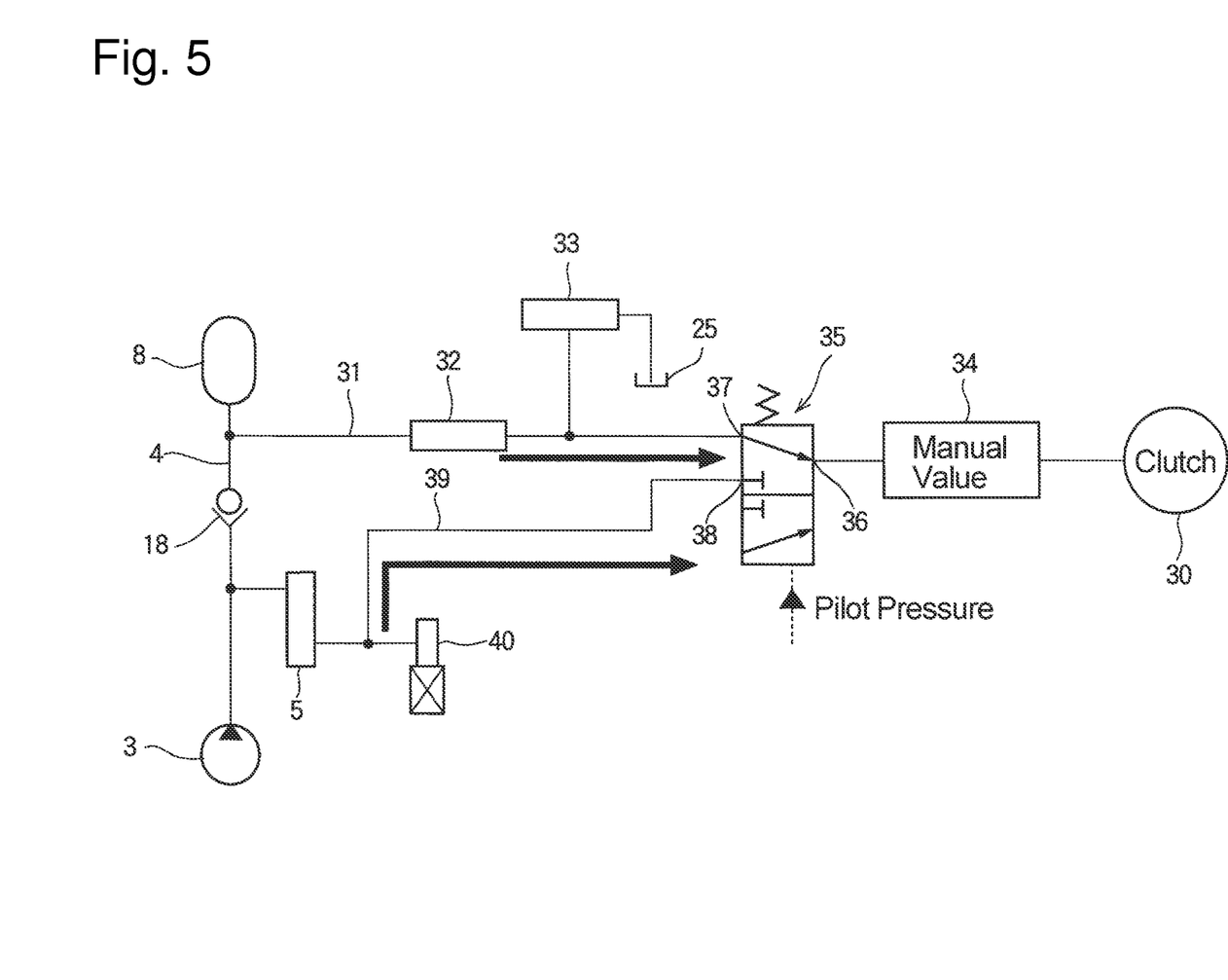
FIG. 5 is a hydraulic circuit diagram schematically showing an example of arranging a solenoid valve having a large flowing capacity and a diametrically larger oil passage in the hydraulic control system to deliver the fluid promptly to the clutch.

In addition, according to the hydraulic control system shown in FIG. 1, pressure rise in the operating fluid can be promoted by disconnecting the accumulator 8 from the control circuit 1, in case the operating pressure higher than the accumulator pressure Pa is required. In other words, the operating pressure is raised quickly by reducing the delivery points of the fluid. Alternatively, it is also possible to facilitate the pressure rise in the fluid by temporarily increasing a delivery amount of the fluid. FIG. 5 is a view showing an example of the hydraulic control system structured to increase a flow rate of the operating fluid transiently.

The example shown in FIG. 5 is structured to increase an amount of the fluid delivered to the clutch 30 temporarily when engaging the clutch 30 being disengaged. In the example shown in FIG. 5, an oil passage 31 is branched from the oil passage 4 to be connected with the clutch 30. A manual valve 34 and a switching valve 35 are arranged on the oil passage 31 in order from the clutch 30 side. The manual valve 34 is a conventional one used in an automatic transmission for automobiles. Specifically, the manual valve 34 is adapted to manually select a drive position of the vehicle from a parking position for parking the vehicle, a reverse position for driving the vehicle backwardly, and a drive position for driving the vehicle in the forward direction. For example, in case the drive position is selected, the manual valve 34 opens the oil passage 31 to deliver the fluid to the clutch 30.

The switching valve 35 comprises an output port 36 connected with the manual valve 34, and a pair of input ports 37 and 38. For example, under the OFF state in which a pilot pressure is not applied thereto, the first input port 37 is connected with the output port 36 to achieve a first operating state. To the contrary, under the ON state in which the pilot pressure is applied thereto, the second input port 38 is connected with the output port 36 to achieve a second operating state. The aforementioned feeding solenoid valve 32 and draining solenoid valve 33 are arranged on the oil passage 31, and the oil passage 31 is connected with the first input port 37. Meanwhile, the second input port 38 is connected with a diametrically larger oil passage 39. An inner diameter of the diametrically larger oil passage 39 is larger than that of the oil passage 31 connected with the first input port 37 so that a larger amount of the fluid can be delivered to the clutch 30 through the diametrically larger oil passage 39.

In the example shown in FIG. 5, a solenoid valve 40 having a large flowing capacity to deliver the signal pressure is connected with the regulator valve 5, and the diametrically larger oil passage 39 is also connected with the solenoid valve 40.

The aforementioned signal pressure establishing valve 6 may also be used as the solenoid valve 40, and the solenoid valve 40 is controlled by the electronic control unit 7. For example, the clutch 30 is engaged and a transmission torque capacity thereof can be controlled by delivering the signal pressure to the clutch 30 through the diametrically larger oil passage 39 while regulating to a predetermined pressure. Alternatively, the clutch 30 can be substantially disengaged by lowering the fluid pressure delivered thereto. Thus, the example shown in FIG. 5 comprises two hydraulic lines such as a hydraulic line for controlling an engagement state of the clutch 30 at a normal flow rate, and a hydraulic line for controlling an engagement state of the clutch 30 at a high flow rate.

Figure 6:
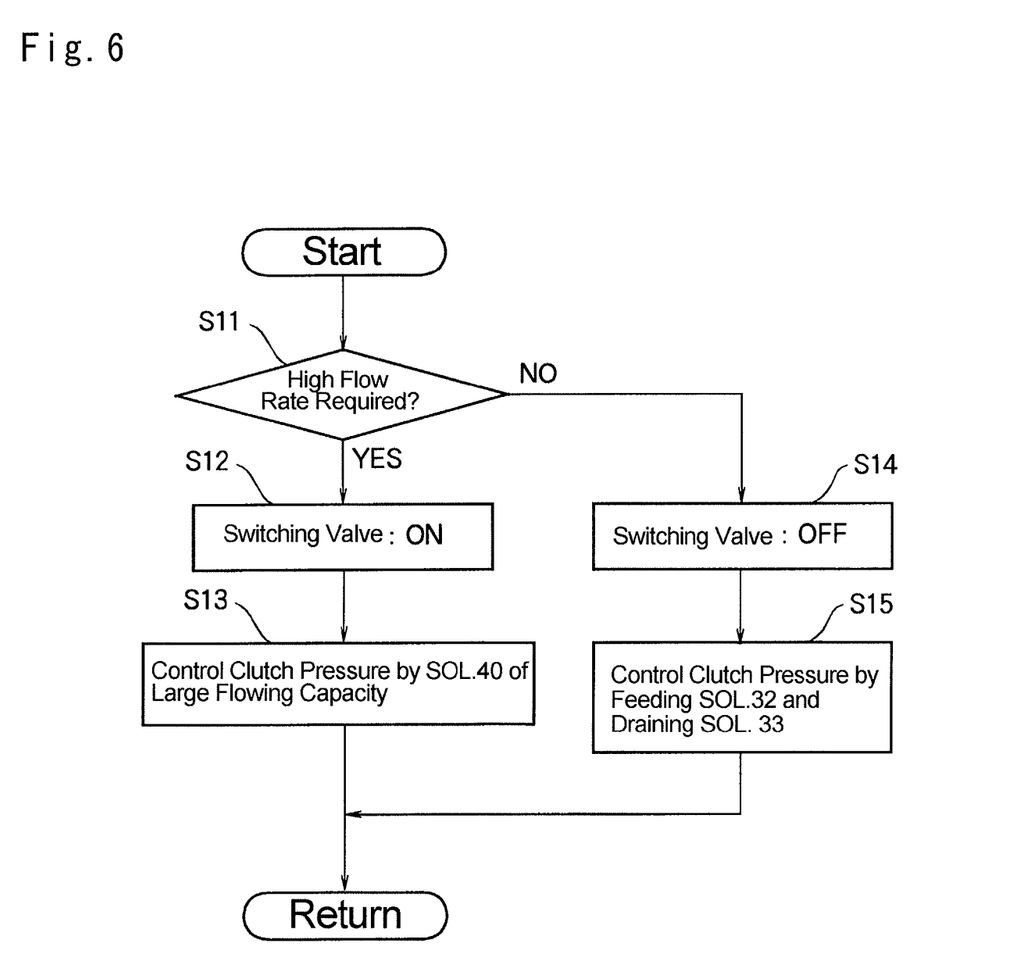
FIG. 6 is a flowchart explaining a control example carried out to control the hydraulic control system shown in FIG. 5.

A procedure of switching those hydraulic lines is shown in FIG. 6. According to the control example shown in FIG. 6, first of all, it is judged whether or not the high flow rate is required (at step S11). The example shown in FIG. 5 is structured to control the fluid pressure applied to the clutch 30. In the hydraulic control system thus structured, a required amount of the fluid is increased when engaging the clutch 30 being disengaged. Therefore, in case of carrying out a speed change operation while engaging or disengaging the clutch 30, the answer of step S11 would be YES. For example, in case of carrying out a garage shifting by switching the travelling direction of the vehicle frequently between the forward direction and the backward direction, the judgment at step S11 judges a fact that the high flow rate of the fluid is required based on a signal from a shifting device.

In case the answer of step S11 is YES, the switching valve 35 is turned into the ON state by delivering the pilot pressure to the switching valve 35 (at step S12). As described, in the switching valve 35, the first input port 37 is closed and the second input port 38 is connected with the output port 36 under the ON state. In this case, therefore, the solenoid valve 40 having a large flowing capacity is connected with the manual valve 34 through the diametrically larger oil passage 39. In this situation, if the manual valve 34 is switched in a manner to drive the vehicle in the forward direction, the fluid pressure applied to the clutch 30 is controlled by the solenoid valve 40 (at step S13). Thus, the fluid can be delivered to the clutch 30 in a large amount to control the pressure applied to the clutch 30. Consequently, the control response can be improved.

To the contrary, in case the answer of step S11 is NO, that is, in case the high flow rate of the fluid is not required, the switching valve 35 is turned into the OFF state by stopping the delivery of the pilot pressure to the switching valve 35 (at step S14). As described, in the switching valve 35, the second input port 38 is closed and the first input port 37 is connected with the output port 36 under the OFF state. In this case, the oil passage 31 on which the feeding and draining solenoid valves 32 and 33 are arranged is connected with the manual valve 34. Therefore, if the manual valve 34 is switched in a manner to drive the vehicle in the forward direction, the fluid pressure applied to the clutch 30 is controlled by the feeding and draining solenoid valves 32 and 33 (at step S15). As described, the diameter of the oil passage 31 is relatively smaller. Therefore, the flow rate of the fluid flowing through the oil passage 31 is not so high so that a leakage loss can be reduced. In addition, if a poppet valve which can confine the pressure therein is used as the feeding and draining solenoid valves 32 and 33, leakage of the fluid from the valves 32 and 33 can be further reduced. Therefore, an energy loss can be further reduced. In addition to the above-explained advantages, in case a large amount of the fluid is required by the clutch 30 or by a corresponding actuator, the fluid can be delivered to the actuator to control the pressure applied thereto through the solenoid valve 40 having a large flowing capacity and the diametrically larger oil passage 39. That is, the feeding and draining solenoid valves 32 and 33 are used only in case such a large amount of the fluid is not especially required. Therefore, the flowing capacities of the feeding and draining solenoid valves 32 and 33 are not necessarily to be so large. For this reason, the hydraulic control system can be downsized.

Thus, the hydraulic control system shown in FIG. 5 comprises two hydraulic lines to deliver the fluid to the clutch 30. Therefore, the fluid pressure applied to the clutch 30 can be controlled using the solenoid valve 40 having a large flowing capacity even if a failure occurs on any of the solenoid valves 32 and 33. A control example to be carried out under such situation will be explained with reference to the flowchart shown in FIG. 7. First of all, it is judged whether or not a failure occurs on any of the feeding and draining solenoid valves 32 and 33 being used under the normal situation (at step S21). The judgment at step S21 can be made by comparing the control signal with a condition of the fluid pressure achieved based on the control signal. In case a failure occurs on any of the solenoid valves 32 and 33 so that the answer of step S21 is YES, the switching valve 35 is turned into the ON state (at step S22). Specifically, the solenoid valve 40 having a large flowing capacity is connected with the manual valve 34 or the clutch 30 through the diametrically larger oil passage 39.

Figure 7:
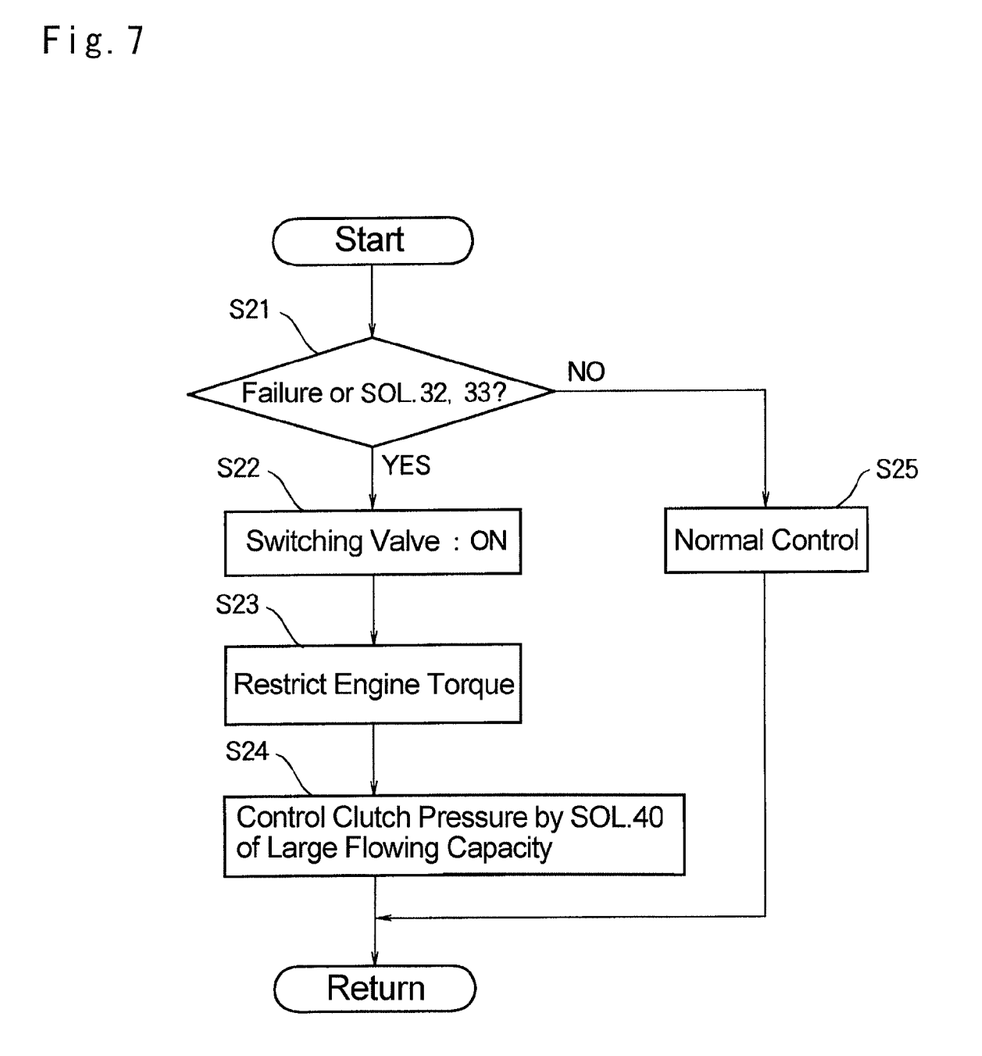
FIG. 7 is a flowchart explaining another control example carried out to control the hydraulic control system shown in FIG. 5.

Then, an engine torque is restricted (at step S23). Although a large amount of the fluid can be delivered promptly to the clutch 30 through the solenoid valve 40, the pressure of the fluid being delivered therethrough is rather low. In this case, therefore, the transmission torque capacity of the clutch 30 may be smaller in comparison with the torque applied to the clutch 30. Therefore, in order to avoid a slippage or disengagement of the clutch 30, the torque applied to the clutch 30, that is, the engine torque is restricted to be smaller than that under the normal situation. After thus carrying out the control of step S23, the fluid pressure applied to the clutch 30 is controlled by the solenoid valve 40 having a large flowing capacity (at step S24).

To the contrary, in case no failure occurs on any of the feeding and draining solenoid valves 32 and 33 so that the answer of step S21 is NO, the normal control, that is, the control shown in FIG. 6 is carried out (at step S25). Besides, in case a failure occurs on the solenoid valve 40 having a large flowing capacity, the fluid pressure applied to the clutch 30 will be controlled totally by the feeding solenoid valve 32 and the draining solenoid valve 33.

The invention claimed is:

1. A hydraulic control system, comprising:
    a regulator valve, which regulates a fluid pressure established by an oil pump to an operating pressure required in a control circuit;
    a signal pressure establishing valve, which applies a signal pressure to the regulator valve so that a level of the fluid pressure to be established by the regulator valve is changed depending on the signal pressure applied to regulator valve;
    an accumulator, which accumulates the operating pressure to be applied to the control circuit;
    an accumulator control valve, which is arranged between the accumulator and the control circuit; and
    a signal pressure feeding passage, which delivers the signal pressure established by the signal pressure establishing valve to a signal pressure port of the accumulator control valve thereby actuating the accumulator control valve in accordance with the signal pressure;

wherein the accumulator control valve is closed to disconnect the accumulator from the control circuit by the signal pressure established by the signal pressure establishing valve, in case the signal pressure establishing valve outputs the signal pressure at a level to raise the operating pressure in the control circuit; and the accumulator control valve is opened to connect the accumulator with the control circuit by the signal pressure established by the signal pressure establishing valve, in case the signal pressure establishing valve outputs the signal pressure at a level to lower the operating pressure in the control circuit.

2. The hydraulic control system as claimed in claim 1, further comprising:

a low pressure circuit activated by the pressure lower than that in the control circuit;

wherein the regulator valve is adapted to regulate the fluid pressure to be lower than the operating pressure delivered to the control circuit in accordance with the signal pressure, when the level of the signal pressure is lower than a predetermined level.

* * * * *